United States Patent
Dumitras

(10) Patent No.: US 12,165,104 B2
(45) Date of Patent: *Dec. 10, 2024

(54) RESOURCE CONSUMPTION SYSTEMS

(71) Applicant: Alan Dumitras, Douglasville, GA (US)

(72) Inventor: Alan Dumitras, Douglasville, GA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/058,357

(22) Filed: Nov. 23, 2022

(65) Prior Publication Data

US 2023/0081871 A1    Mar. 16, 2023

Related U.S. Application Data

(63) Continuation of application No. 17/066,625, filed on Oct. 9, 2020, now Pat. No. 11,531,963.

(51) Int. Cl.
| | |
|---|---|
| *G06Q 10/08* | (2024.01) |
| *G06Q 10/0875* | (2023.01) |
| *G06K 19/07* | (2006.01) |
| *G06Q 20/20* | (2012.01) |

(52) U.S. Cl.
CPC ..... *G06Q 10/0875* (2013.01); *G06K 19/0723* (2013.01); *G06Q 20/203* (2013.01)

(58) Field of Classification Search
CPC .................................................. G06Q 10/0875
See application file for complete search history.

(56) References Cited

U.S. PATENT DOCUMENTS

| | | | |
|---|---|---|---|
| 6,816,074 B2 * | 11/2004 | Wong ................... | G06Q 10/087 232/27 |
| 7,324,905 B2 | 1/2008 | Droubie et al. | |
| 7,523,053 B2 | 4/2009 | Pudhukottai et al. | |
| 7,899,693 B2 | 3/2011 | King | |
| 9,418,262 B1 * | 8/2016 | Gentile .............. | G06K 7/10009 |
| 9,418,263 B2 | 8/2016 | Butler et al. | |

(Continued)

OTHER PUBLICATIONS

International Preliminary Report on Patentability for International Application No. PCT/US2021/053940, mailed Apr. 20, 2023, 10 Pages.

(Continued)

*Primary Examiner* — Fateh M Obaid

(74) *Attorney, Agent, or Firm* — Morris, Manning & Martin, LLP; Daniel E. Sineway, Esq.; Adam J. Thompson, Esq.

(57) ABSTRACT

A resource consumption system can include a plurality of resources positioned within at least one rack and at least one sensor configured to detect removal of an amount of the plurality of resources from the respective rack. The resource consumption system can include at least one transmitter configured to transmit a notification based on the at least one sensor detecting the removal of the amount of resources, wherein the notification comprises a resource identifier, an entity identifier, and the amount of the plurality of resources. The resource consumption system can include at least one computing device configured to compute an amount based on the resource identifier and the amount of resources, generate a request based on the notification, and transmit the request to an entity associated with the entity identifier, wherein the request comprises the resource identifier, the entity identifier, and the amount.

20 Claims, 7 Drawing Sheets

(56) References Cited

U.S. PATENT DOCUMENTS

| | | |
|---|---|---|
| 10,176,449 B1 | 1/2019 | Krohn et al. |
| 10,371,786 B1 | 8/2019 | Orlov et al. |
| 10,402,779 B2 | 9/2019 | Mai |
| 10,558,943 B2 | 2/2020 | Nakdimon et al. |
| 10,679,181 B1* | 6/2020 | Prater .................. G06Q 10/087 |
| 10,803,499 B1 | 10/2020 | Davis et al. |
| 10,969,461 B1 | 4/2021 | O'Neill et al. |
| 10,984,378 B1 | 4/2021 | Eckman et al. |
| 11,227,270 B2* | 1/2022 | Ahmed ................. G06Q 20/14 |
| 11,531,963 B2 | 12/2022 | Dumitras |
| 2002/0117429 A1 | 8/2002 | Takizawa |
| 2002/0138377 A1 | 9/2002 | Weber |
| 2002/0196953 A1* | 12/2002 | Burke .................. H04R 1/1016 455/100 |
| 2003/0126103 A1* | 7/2003 | Chen ...................... G06Q 10/08 706/50 |
| 2005/0016055 A1 | 1/2005 | Moyle |
| 2005/0060246 A1* | 3/2005 | Lastinger ............. G06Q 10/087 705/28 |
| 2005/0222889 A1* | 10/2005 | Lai ........................ G06Q 10/06 705/7.41 |
| 2007/0035380 A1* | 2/2007 | Overhultz ............ G06Q 10/087 340/539.22 |
| 2007/0239569 A1* | 10/2007 | Lucas .................. G06Q 10/087 705/28 |
| 2008/0052200 A1* | 2/2008 | Bodin ................. G06Q 10/0875 705/28 |
| 2008/0122615 A1* | 5/2008 | Shoenfeld .............. G08B 13/14 700/218 |
| 2008/0128498 A1* | 6/2008 | Fausak ................ G06Q 10/087 235/385 |
| 2008/0204253 A1 | 8/2008 | Cottee et al. |
| 2009/0281930 A1 | 11/2009 | Sakagami |
| 2010/0157051 A1* | 6/2010 | Pankanti ................ G06Q 10/00 382/165 |
| 2010/0217681 A1 | 8/2010 | Geikie et al. |
| 2010/0218131 A1* | 8/2010 | Holm-Petersen .... G06Q 10/087 715/771 |
| 2010/0274366 A1 | 10/2010 | Fata et al. |
| 2011/0267172 A1* | 11/2011 | Riechel ................ G06K 7/0004 348/222.1 |
| 2012/0216243 A1 | 8/2012 | Gill et al. |
| 2013/0235206 A1* | 9/2013 | Smith .................. G06Q 10/087 348/150 |
| 2013/0253700 A1* | 9/2013 | Carson .................. G16H 20/13 700/236 |
| 2014/0279600 A1 | 9/2014 | Chait |
| 2014/0337040 A1* | 11/2014 | Debusk ................ G06Q 10/087 705/2 |
| 2015/0120388 A1* | 4/2015 | Tan ........................ H04W 4/02 705/7.32 |
| 2015/0235157 A1* | 8/2015 | Avegliano ............ G06Q 10/087 705/7.25 |
| 2016/0110780 A1* | 4/2016 | DeBusk ................ G16H 40/20 705/3 |
| 2016/0132821 A1 | 5/2016 | Glasgow et al. |
| 2016/0238374 A1* | 8/2016 | Burch, V ............. G06Q 10/083 |
| 2018/0181908 A1 | 6/2018 | Jones et al. |
| 2019/0130285 A1* | 5/2019 | Snyder ................ G06Q 30/0641 |
| 2019/0236528 A1 | 8/2019 | Brooks et al. |
| 2019/0251776 A1 | 8/2019 | Adelberg et al. |
| 2019/0282000 A1 | 9/2019 | Swafford |
| 2019/0310655 A1 | 10/2019 | Voorhies et al. |
| 2019/0392363 A1* | 12/2019 | Kohli ..................... G06Q 50/04 |
| 2020/0043604 A1* | 2/2020 | Singh ...................... G06N 5/02 |
| 2020/0079588 A1* | 3/2020 | McCormick ........... B25H 3/022 |
| 2020/0104907 A1 | 4/2020 | Okamura |
| 2020/0223066 A1 | 7/2020 | Diankov et al. |
| 2020/0228753 A1* | 7/2020 | Ortiz Egea ............ G06V 40/10 |
| 2020/0275775 A1* | 9/2020 | Marriott .................. A47F 10/02 |
| 2020/0317445 A1 | 10/2020 | Schultz et al. |
| 2020/0364660 A1* | 11/2020 | Hines ...................... G16H 20/13 |
| 2020/0377301 A1 | 12/2020 | Chila et al. |
| 2021/0061564 A1 | 3/2021 | Ibe |
| 2021/0097544 A1* | 4/2021 | Annadurai ........... G07G 1/0063 |
| 2021/0133835 A1 | 5/2021 | Gu et al. |
| 2021/0304122 A1* | 9/2021 | Dattamajumdar ... A61G 12/001 |
| 2021/0369014 A1* | 12/2021 | Vukich .............. G06Q 30/0234 |

OTHER PUBLICATIONS

International Search Report and Written Opinion for International Application No. PCT/US2021/053940, mailed Nov. 3, 2021, 12 Pages.

Sorensen A., "Efficient Processes and Transparent Information Flow in Supply Chain Through Use of RFID," MS Thesis, Norwegian University of Science and Technology, Department of Computer and Information Science, Jun. 2007, 160 Pages.

* cited by examiner

RESOURCE CONSUMPTION SYSTEMS

CROSS-REFERENCE TO RELATED APPLICATION

This application is a continuation of U.S. patent application Ser. No. 17/066,625, filed Oct. 9, 2020 and entitled "RESOURCE CONSUMPTION SYSTEMS," which is incorporated herein by reference in its entirety.

BACKGROUND

Large complexes, such as distribution hubs, may require local repositories of service resources, such as soaps and other cleaning resources. The service resources are typically organized in bulk containers, such as pallets. The large complexes typically do not tabulate consumption or availability of the service resource on a case-by-case or unit-by-unit manner, resulting in wasteful over-ordering of the resources due to a lack of tabulation and consumption data. Thus, there is a long-felt, but unmet need for a system or process for automatic tabulation and tracking of service resource availability and consumption in large complexes.

BRIEF DESCRIPTION OF THE DRAWINGS

For a more complete understanding of the embodiments and the advantages thereof, reference is now made to the following description, in conjunction with the accompanying figures briefly described as follows.

Figure 1:
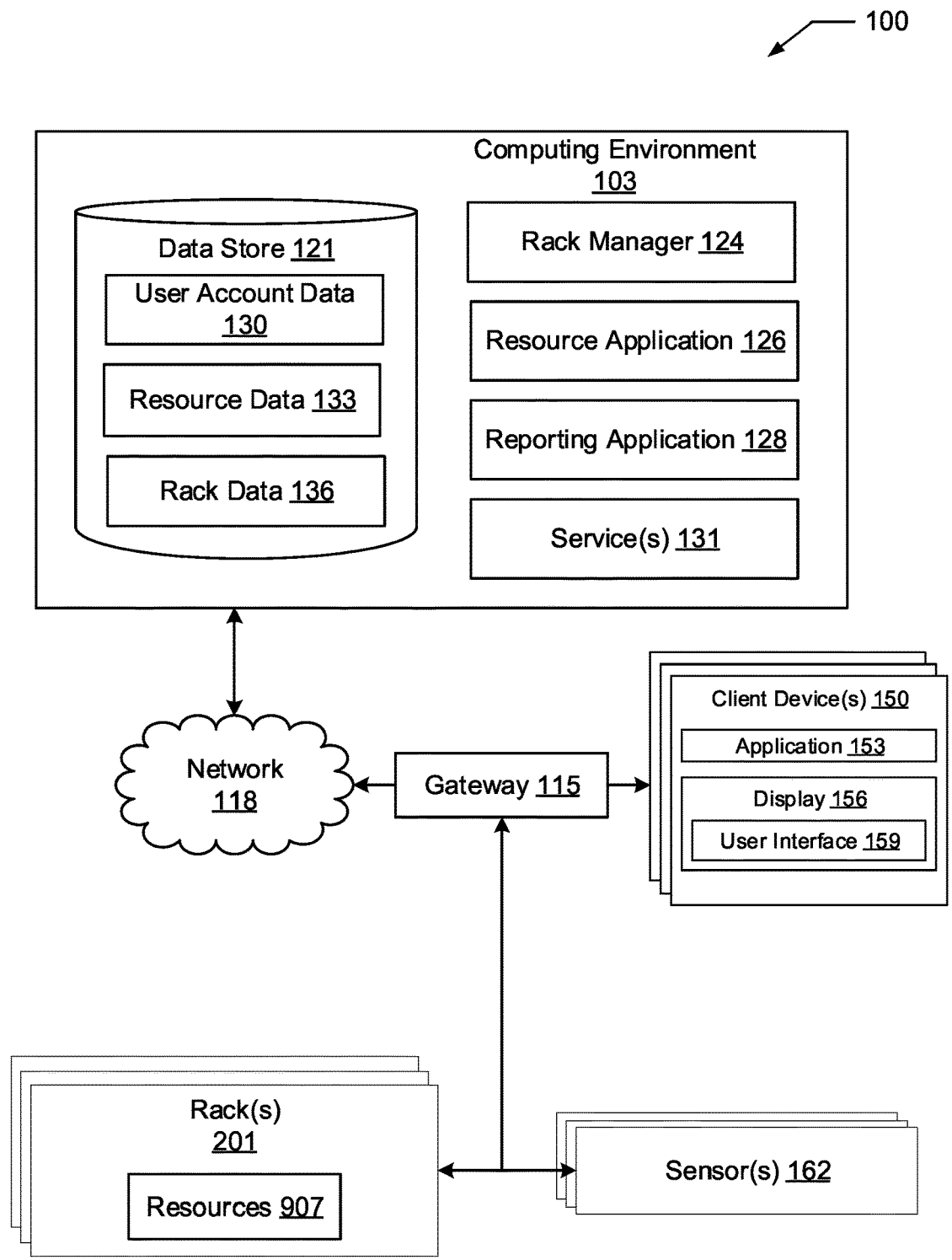
FIG. 1 is a diagram of the networked environment according to various example embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Various embodiments of the present disclosure relate to systems and processes for automatically detecting, tabulating and responding to resource consumption. For example, the systems and processes of the present disclosure can track and tabulate resource consumption by detecting removal of resources from one or more predetermined zones.

According to the present disclosure, the present systems and methods allow entities and resource providers to track consumption of various resources by contractors and other personnel and ensure that the resource consumption is properly computed before a request for imbursement is initiated. As an example, if an entity falsely reports that they consumed a lower quantity of resources than were actually consumed, the resource provider may generate an incorrect request for imbursement for the entity, thereby resulting in underpayment. However, with the disclosed systems and processes, if the racks described herein automatically detect and record the entity's resource consumption, a correct request for imbursement can be automatically generated and transmitted to the entity (e.g., in a manner that, among other benefits, reduces a potential for erroneous consumption reporting by the entity).

In one or more embodiments, the present system is configured to provide a gated solution for detecting and tracking delivery and consumption of resources to and from one or more physical areas. According to one embodiment, the gated solution includes performing one or more processes for interrogating readable elements, processing readings to extract identifiers, determining if the identifiers are associated with particular resources (e.g., or with other readable elements), and, based on analyses of the readings, determining delivery or consumption of a resource. Various embodiments of the present system can include a plurality of racks and a computing environment. Each of the plurality of racks can be arranged in a particular location of a facility, such as a warehouse. Each rack can include one or more resources, such as, for example, a variety of cleaning agents. Each rack can include one or more sensors that detect resource delivery and consumption events into and out of the rack. The one or more sensors can be connected to a transmitter that generates notifications based on the one or more sensors detecting deposition or removal of one or more resources to or from the rack. The transmitter can transmit notifications to the computing environment, the notifications including, but not limited to, one or more identifiers (e.g., resource identifiers, a rack identifier, etc.), a quantity of resources deposited or removed, and metadata such as a timestamp. Transmissions can occur via a network.

The computing environment can include one or more servers and one or more processors for receiving and processing transmissions from the plurality of racks. The computing environment can perform various actions in response to receiving resource event notifications from the plurality of racks. The various actions can include, but are not limited to, generating and transmitting requests and alerts, generating and causing the rendering of resource utilization visualizations, and other actions. The computing environment can include one or more micro services for performing independently scaleable and configurable processes. Non-limiting examples of the one or more micro services (e.g., also referred to as services) include, but are not limited to, a read service, a catalogue service, a device data service, a configuration service, a device health service, a facility service, a facility devices service, a facility images service, a facility inventory service, an identity management service, and a web service.

In some embodiments, the computing environment executes a point of sale (POS) software system with an integrated dashboard for managing commercial resources and volume usage thereof that are sold on a per case or per resource basis. Palletized cases of resources are delivered to a resource space and placed into a rack including RFID sensing elements that can read RFID tags on the cases of resources from up to about 2-3 feet or less. As the cases are delivered to the rack, the RFID sensing elements capture the total quantity of resource inventory per case on each pallet and uploads the information to an inventory dashboard.

The inventory dashboard can be rendered as a user interface on one or more client devices (or any client device in which an authorized user is logged thereon). When a case or resource is moved more than 2-3 feet from the RFID sensing elements, the RFID tag of the case or resource is captured and transmitted to the computing environment that updates the inventory dashboard to indicate the case or resource is a sold item (e.g., the removal thereof constituting a purchase of the item). The inventory dashboard can provide value to entities consuming the resources by giving live usage data per resource and by providing long term cost analyses per resource. At the end of a predetermined period (e.g., a month, a quarter, etc.), the computing environment can update the inventory dashboard to include a total monthly sale ticket per each case or resource that was determined sold. The periodic summary update can provide an entity additional days of cash-flow because of the sale per case or resource approach, which allows for resources to be paid for as consumed, as opposed to being paid for as delivered. The per use tracking and payment approach is thus an improvement over previous approaches that rely on payment of lump sum costs at the time of delivery of a large quantity of resources.

Based on resource delivery or consumption events, a rack manager of the computing environment can increment or decrement resource counters that track a quantity of each resource present in each of the plurality of racks. In another example, based on a decremented resource counter, a resource application can determine that a present quantity of resources is beneath a threshold level. In the same example, based on the determination, a reporting application can automatically generate and transmit a request to an entity. The request can be a request for payment for the decremented quantity of resources, for ordering of additional resources, or for other actions. In another example, the reporting application automatically transmits alerts to one or more entities indicating utilization statistics regarding one or more resources.

The computing environment 103 can perform predictive analysis on captured data to optimize activities related to resources 907 including, but not limited to, consumption, delivery, organization, and resource type. The predictive analysis may include generating and training machine learning models for determining an optimal date for scheduling future delivery events, which can be based on various factors, such as a duration between previous delivery events and consumption events on a particular type of resource 907. The consumption of various resources 907 may also be optimized based on various factors, such as an average amount of a resource 907 consumed within a particular facility or across multiple facilities. The resource 907 can include a particular item, such as, for example, cleaning liquid, paper towels, light bulbs, and other products. Each resource 907 can include one or more readable elements, such as, for example, passive RFID tags. In one example, a resource 907 comprises two tags and is transported to a facility. At the facility, the resource 907 is placed into a rack 201 and the placement is detected by a sensor 162. The sensor 162 interrogates the tags, receives interrogation data comprising two or more identifiers, and transmits the interrogation data to one or more elements of the networked environment 100, such as one or more services 131. In one embodiment, the services 131 includes a plurality of micro services.

According to various embodiments, resources are located across an area to be tracked, such as manufacturing locations, warehouses, distribution centers, hospitals, hotels, resorts, etc. Typically, the resources are housed in cases and each of the cases are housed in one or more racks, for example, as shown in FIG. 1. In various embodiments, multiple cases can be housed in a single rack. Each rack can detect when a case is placed inside the rack (e.g., a delivery event). Each rack can also detect when the case is removed from the rack (e.g., a consumption event). The racks communicate via a transmitter to a computing environment via a network. The transmitter can be connected to one or more sensors and receive and process readings therefrom. The one or more sensors can be placed throughout the rack (and/or throughout the surrounding area in a mesh formation) and the sensors may also communicate with the computing environment via transmitting means and a network. The racks and/or sensors can transmit event information to the computing environment, such as, data corresponding to when a case enters a rack and when the case leaves the rack.

According to various embodiments, the racks, cases/container, and resources each have an identifier that is assigned to them. When a case or resource enters or leaves a rack, sensors can identify the case or resource by its identifier and can communicate the identifier to the computing environment via the gateway. The computing environment can track the movement of the cases and resources based on the events communicated to it by the various racks and sensors. The computing environment can send configuration commands to the racks and sensors, individually or as a group to configure operating parameters thereof.

In the following paragraphs, the embodiments are described in further detail by way of example with reference to the attached drawings. In the description, well known components, processes, and/or processing techniques are omitted or briefly described so as not to obscure the embodiments. As used herein, the "present disclosure" refers to any one of the embodiments described herein and any equivalents. Furthermore, reference to various feature(s) of the "present disclosure" is not to suggest that all embodiments must include the referenced feature(s).

The embodiments described herein are not limited in application to the details set forth in the following description or illustrated in the drawings. The embodiments disclosed are capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to FIG. 1, shown is a drawing of a networked environment 100 according to various example embodiments of the present disclosure. The networked environment 100 includes a computing environment 103, one or more racks 201, and potentially other devices.

The computing environment 103 and racks 201 are in communication via a network 118 with the computing environment 103. The network 118 includes, for example, the Internet, intranets, extranets, wide area networks (WANs), local area networks (LANs), wired networks, wireless networks, cable networks, satellite networks, or other suitable networks, etc., or any combination of two or more such networks. In some embodiments, a gateway 115 manages communications at the network 118. The gateway 115 can be a Software Defined Networking (SDN) device. In various embodiments, the network connection utilizes IPSEC tunneling to communicate data with the computing environment 103 in adherence to the SDWAN (Software defined wide area networking) standard.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may include a hosted computing resource, a grid computing resource, a cloud computing environment, and/or any other distributed computing arrangement. In some cases, the computing environment 103 may correspond to an elastic computing resource where the allotted capacity of processing, network, storage, or other computing-related resources may vary over time.

The components executed on the computing environment 103, for example, include a rack manager 124, resource application 126, a reporting application 128, and other applications, services, processes, systems, engines, or other functionality.

The rack manager 124 processes information related to the racks 201. In some embodiments, the rack manager 124 includes one or more computing devices that are located at a facility within which racks 201 and sensors 162 are installed. In one example, the rack manager 124 comprises onsite computing resources configured to upload data from each sensor 162 and rack 201 to the data store 121. In this example, the data store 121 comprises a cloud-based storage environment and the rack manager 124 is configured to upload data in a throttled manner (e.g., initiating uploads every 30 seconds, 120 seconds, etc.). The information processed by the rack manager 124 can include readings from one or more sensors 162 that indicate resource delivery or consumption events. The rack manager 124 can track the delivery, consumption, and distribution of resources 907 throughout the racks 201 to provide up-to-date counts of resource availability on a rack-by-rack basis. The rack manager 124 can push new firmware or software to networked elements of the racks 201 (such as sensors 162), to the gateway 115, to client devices 150, and other computing elements of the networked environment 100. The rack manager 124 can manage configuration, deployment, and monitoring of sensors 162 and the gateway 115. In one example, the rack manager can monitor a status of each sensor 162, the status including, but not limited to, a battery life, a sensing mode, a sensing frequency, a sensor location, operating protocols, and downtime events.

The resource application 126 processes information related to resources 907. The resource application 126 can track a current availability of resources 907 and generate estimations of resource consumption rates based on historical resource delivery and consumption event data. The resource application 126 can generate various requests based on resource availability, delivery, and consumption. For example, the resource application 126 can generate a request for additional resources 907 based on determining a current availability of resources 907 has fallen beneath threshold levels. In another example, the resource application 126 can generate a request for payment upon determining that a quantity of resources 907 has been delivered to a rack 201. In another example, the resource application 126 can generate a request for payment upon determining that a threshold quantity of resources 907 has been consumed (e.g., removed from a rack 201).

The reporting application 128 generates reports, notifications, and alerts based on various processes performed in the computing environment 103. For example, the reporting application 128 can generate a notification confirming the delivery of a quantity of resources 907. In another example, the reporting application 128 can generate an alert based on a resource application 126 determining that a quantity of a resource has fallen beneath a threshold quantity. In another example, the reporting application can generate a report including historic resource delivery and/or consumption events and corresponding analytics, such as data visualizations and other computed metrics. The various reports, notifications, and/or alerts can include the various requests generated by the resource application 126.

The reporting application 228 can generate an activity report for a particular rack 201 or plurality thereof. The activity report may show the activity corresponding to one or more racks 201 selected by an input to the user interface 159. For example, for a rack 201 selected from a user interface 159, the activity report may show, for a selected time frame, various resource quantities, the time corresponding to a most-recent delivery of various resources 907, and current consumption rates of the various resources 907 currently present in the rack 201.

The computing environment 103 can include a data store 121 in which various data is stored and made accessible to various applications of the computing environment 103 or connected thereto via the network 118. The data store 121 may be representative of a plurality of data stores as can be appreciated. The data stored in the data store 121 for example, is associated with the operation of the various applications and/or functional entities described below.

The data stored in the data store 121 includes, for example, user account data 130, resource data 133, rack data 136, and potentially other data. The user account data 130 can include user account credentials, such as identifiers, as well as location information, payment processing information, contact information, and resource management parameters (e.g., such as various thresholds discussed herein). Various user accounts may be stored in the user account data 130 including, but not limited to, administrator accounts and user accounts controlled by various entity receiving deliveries of and consuming various resources 907 (e.g., entities controlling locations in which the racks 201 are arranged).

Further, the user account data 130 may also contain authentication data that can be used to authenticate a user account via client device 150. The authentication data can include user names and passwords, or other authentication credentials. The authentication credentials can be stored in plaintext, encrypted or hashed form. The authentication data can also include other types of data used to authenticate a user of a client device, such as biometric information, single sign-on data, and other data. In various embodiments, Entrust or RSA token may be used to authenticate one or more user accounts, including for administrative rights. Further, Network Access Control (NAC) may also be used to authenticate user accounts. Additionally, the user account data 130 may be linked to data included in the resource data 133 or rack data 136.

The resource data 133 can include data about various resources 907 stored in the racks 201, resources 907 delivered and deliverable to the racks 201, and resources 907 consumed from the racks 201. The resource data 133 can include information associated with historic resource delivery and consumption events. The information can include, but is not limited to, event timestamps, resource identifiers, rack identifiers, and other identifiers, as well as consumption or delivery threshold data.

The resource data 133 can be used by a machine learning application executed in the computing environment 103 to determine efficiencies, trends, and other metrics. For example, the metrics can include a comparison of efficiencies of various delivery and/or consumption parameters associated with a user account as related to historic delivery and consumption event data.

The rack data 136 can include data about racks 201 and other devices, such as sensors 162. The rack data 136 may include information about a location of each rack 201. In some embodiments, a location of the rack 201 can be determined using one or more sensors 162, such as real-time location system (RTLS) sensors. In some embodiments, the rack 201 can determine a location by communicating with the sensors 162. For example, the rack 201 can identify a current location based off a mesh network formed by sensors 162 arranged within each rack 201 of a facility or sub-area thereof.

The rack data 136 can also store activity logs related to resources 907, client devices 150 and/or user accounts associated with each rack 201. For example, the resource data 133 may include a log of all activity, such as historic and scheduled delivery events, consumptions events, requests for data from a client device 150, and other activities.

The computing environment 103 can include one or more services 131 configured for performing various processes and functions. Each service 131 can comprise a set of computing resources including, but not limited to, processors, servers, and data stores. Computing resources of each service 131 can be scaled elastically and individually, for example, in response to a volume of received requests, data, or other need. In various embodiments, computing resources may be shared between two or more services 131. Non-limiting examples of services 131 include, but are not limited to, a read service, a catalogue service, a device data service, a configuration service, a device health service, a facility service, a facility devices service, a facility images service, a facility inventory service, an identity management service, and a web service.

The read service can be configured to receive and process readings from each rack 201 and/or sensor 162. The read service can be configured to perform one or more triangulation processes to analyze readings, such as identifiers, and identify a resource 907 with which the reading is associated. The read service can determine that a particular reading is not associated with a resource 907 (e.g., and may instead be associated with other products within a warehouse or other resource environment). A triangulation process can include, for example, determining a resource environment location (e.g., such as a particular facility, warehouse, etc.) and determining a reading location (e.g., such as a particular rack 201, room, or region of a resource environment location) with which readings are associated.

In one example, an area of a warehouse in interrogated by a sensor 201 and, in response to the interrogation, readings are received, which comprise a plurality of identifiers. The read service (or another service) generates metadata for the plurality of readings, the metadata comprising a resource environment location and a resource location with which the plurality of identifiers are associated. Based on the plurality of identifiers, the read service retrieves historical data with which each identifier is associated. The historical data can include, for example, a resource identifier, a resource environment location, and a resource location (e.g., each of which may be recorded when a resource 907 is delivered to a rack 201 or the like).

Continuing the example of the preceding paragraph, the read service compares the metadata of each of the plurality of readings to the corresponding historical data. Based on the comparison, the read service determines that metadata of a particular identifier matches the resource environment location and resource location of corresponding historical data. In response to determining the match, the read service determines a "good" read and associates the particular identifier with the resource identifier (e.g., thereby indicating that the particular identifier corresponds to a resource 907 and not to another product or device within the resource environment location). In the same example, based on the comparison, the read service determines that metadata of a second identifier does not match the resource environment location and resource location of corresponding historical data. In response to determining the mismatch, the read service determines a "bad" read and does not further process the second identifier (e.g., which, based on the mismatch, likely corresponds to another product or device within the resource environment location).

In one example, the reader service processes one or more identifiers obtained from interrogating RFID tags disposed within resources 907. In this example, the read service stores the identifier and performs one or more triangulation processes to determine that the identifier is associated with particular user account data 130 (e.g., such as a particular user, facility, entity, etc.). Continuing the example, the read service determines that the identifier matches the particular user account data 130 and maps the identifier to a particular sensor 162 that received the identifier, to the rack 201 within which the resource 907 is located, and/or to the facility (or region thereof) within which the rack 201 is located. The read service can transmit a signal to other services 131 indicating the detection of the resource 907 and mapping of the associated identifier.

The catalogue service can be configured to maintain catalogue data for each user account. In one example, the catalogue service processes and maintains a catalogue of products being offered and/or provided to a particular user. In this example, the catalogue service updates catalogue data associated with each product, including, but not limited to, sales prices, quantity, discount, availability, and shipping information. The device data service can be configured to communicate with and manage each sensor 162. For example, upon activation, a sensor 162 transmits a signal to the device data service, the signal comprising a serial number and/or other identifier with which the sensor 162 is associated. Continuing the example, the device data service transmits configuration settings and a unique identifier to the sensor 162, thereby causing the sensor 162 to self-configure according to the configuration settings. In one example, a configuration setting causes a sensor 162 to automatically deactivate in response to detecting (or receiving data indicative of) a humidity level exceeding a predetermined threshold.

The configuration service can be configured to store configuration data for various elements of the networked environment 100. For example, the configuration service can store configuration profiles and firmware images for each sensor 162 and rack 201. The configuration service can determine a current configuration of the sensor 162 and identify configuration data by which the sensor 162 is updated to an optimal configuration. In one example, the configuration service causes a sensor 162 to re-configure such that an automated temperature shutoff threshold is increased from 120 degrees Fahrenheit to 150 degrees Fahrenheit. In the same example, the configuration service causes the sensor 162 to increase an interrogation sensitivity (e.g., by increasing power provided to an RFID antenna).

The device health service can be configured to monitor and analyze a status of various elements of the rack 201 and sensor 162. The device health service can provide for remote management of the rack 201 and sensors 162. For example, at the device health service, metadata for a particular sensor 162 can be configured to indicate that the particular sensor 162 is at a particular facility. In another example, at a predetermined frequency (e.g., every 30 seconds, 90 seconds, etc.) a sensor 162 transmits a current status (e.g., antenna state, temperature, power level, configuration, etc.) to the device health service. The device health service automatically evaluates the current status to determine if the sensor 162 is healthy, not healthy, or unknown. In one example, the device health service compares a power level to a predetermined power threshold and, in response to determining that the threshold is not met, generates an alert to charge or service the associated sensor 162. In another example, the device health service that a predetermined time period has passed since receiving a transmission from the sensor 162. In this example, in response to determining the passage of the predetermined time period, the device health service transmits an alert (e.g., to a system administrator or facility manager). The device health service can be configured to communicate via simple mail transfer protocol (SMTP) or other suitable communication protocols.

The facility service can be configured to receive and store various data with which each facility is associated. For example, for each facility comprising a rack 201, the facility service can maintain a database comprising a facility location, facility contact information, personnel contact information, facility capabilities (e.g., communication networks, power on-site, etc.), and other data. The facility device service can be configured to track and store a location of each rack 201 and/or sensor 162. For example, for each facility, the facility device service can maintain a log comprising identifiers of each rack 201 and sensor 162 located in the facility. In the same example, upon activation of a new sensor 162 at a particular facility, the facility device service receives a transmission comprising a mapping of a sensor identifier to a particular facility identifier. Continuing this example, the facility device service retrieves a log with which the particular facility is associated and updates the log to include the sensor identifier and a timestamp.

The facility image service can be configured to store images from one or more sensors 162 or other sensors, such as security surveillance systems. The facility image service can store images associated with the installation of each sensor 162 and rack 201. In one example, a technician installs a sensor 162 and uses a computing device to capture and transmit an image of the installation location. In this example, the facility image service receives the transmission comprising the image, a facility identifier, and/or a sensor identifier. Continuing this example, the facility image service stores and tags the image with the one or more identifiers.

The facility inventory service can be configured to integrate catalogue data and resource data 133. The facility inventory service can process data associated with resource consumption and delivery events to generate and update logs of available inventory and inventory usage. The log can include, for example, a count of resources 907, locations of the resources 907 (e.g., within a particular facility), a current consumption level associated with a magnitude of resources consumed, and invoicing data associated with a remittance for resource consumption.

The identity management service can be configured to perform privileged access management (PAM) processes, such as, for example, maintaining and enforcing security policies for various services and elements of the networked environment 100. In one example, the identity management service can provide token-based processes (e.g., which may be vaulted or vaultless) for transmitting sensitive data, such as personally identifying data (PII), and other information. In another example, the identify management service enforces rolling credential management policies and/or multi-factor authentication policies for each user account in communication with the networking environment 100. The credential management policies can include automatically initiating credential changes processes and configuring credential properties such as username and password requirements. The identity management service can be configured to detect potential intrusions or other unauthorized accesses to one or more elements of the networked environment 100. In one example, the identity management service determines that a particular user account has accessed the facility inventory service outside of typical operating hours and, in response, transmits an alert to an administrator account.

The web service can be configured to serve one or more web-based applications to the client device 150 and other network-enabled computing devices. The web service can restrict access to one or more web pages based on user credentials. In one example, the web service generates and hosts a web application comprising interfaces by which a user may interact with various service services 131. In this example, access to a read service is provided to user accounts associated with a first level of credentials and access to a configuration service is provided to user accounts associated with a second level of credentials, the level of credentials being determined based on user account data 130.

The computing environment can communicate with one or more client devices via the network 118. The client device 150 can be representative of one of a plurality of computing devices that may be coupled to the network 118. The client device 150 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head-mounted displays, voice interface devices, or other devices. The client device 150 can include a client application 153 that is operative for communicating with the computing environment 103 based on a permission level corresponding to a user account associated with the client device 150. The client application 153 can transmit and receive data, such as selections, resource tabulations, payment processing information, and other data.

The client device 150 may include a display 156. The display 156 may include, for example, one or more devices such as liquid crystal display (LCD) displays, gas plasma-based flat panel displays, organic light-emitting diode (OLED) displays, electrophoretic ink (E ink) displays, LCD projectors, or other types of display devices, etc. A user interface 159 can be rendered on the display 156. In one example, the user interface 159 is an inventory dashboard including tabulations of current resources 907, tabulations of consumed resources 907, an amount owed based on a tabulation of consumed resources 907, and other information.

The client device 150 can be associated with a user account controlled by a particular entity, such as, for example, a facility or warehouse manager. The client device 150 may be configured to execute various applications such as a client application 253 and/or other applications. The client application 153 can access network content served up by the computing environment 103 and/or other servers, thereby rendering a user interface 159 on the display 156. To this end, the client application 153 can include a browser, a dedicated application, and other applications. The user interface 159 can include a network page, an application screen, etc. The client device 150 may be configured to execute applications beyond the client application 153 such as, for example, email applications, social networking applications, word processors, spreadsheets, and/or other applications. The client device 150 can communicate with computing environment 103 to invoke the resource application 126 and/or the reporting application 128. When the client device 150 invokes the resource application 126 and/or the reporting application 128, the resource application 126 and/or the reporting application 128 causes the client device 150 to generate and render the user interface 159.

The user interface 159 can display a list of resources 907 and resource quantities associated with a user account. The user interface 159 can indicate scheduled or completed delivery events and resource consumption events. As an example, the user interface 159 can show that half of a total quantity of resources 907 in a particular rack 201 have been consumed. The user interface 159 can receive inputs for managing delivery of resources 907, for providing payment processing information to complete resource delivery- or consumption-related payments, or for causing the computing environment 103 to take one or more other actions. The user interface 159 can show information about invoices associated with resources 907 including the amount owed from delivered resources 907, an amount associated with resources 907 partially consumed, and an anticipated resource needs derived from historic resource delivery and consumption data.

The various reports generated by the reporting application 128 can be rendered as information screens presented to an entity via the user interface 159. For example, the reporting application 228 can generate an interface to display the current resource availability and other details of a selection of racks 201 associated with the user account in control of the client device 150. The other details can include status information such as a timestamp of the last removal or delivery event and other information.

Figure 2:
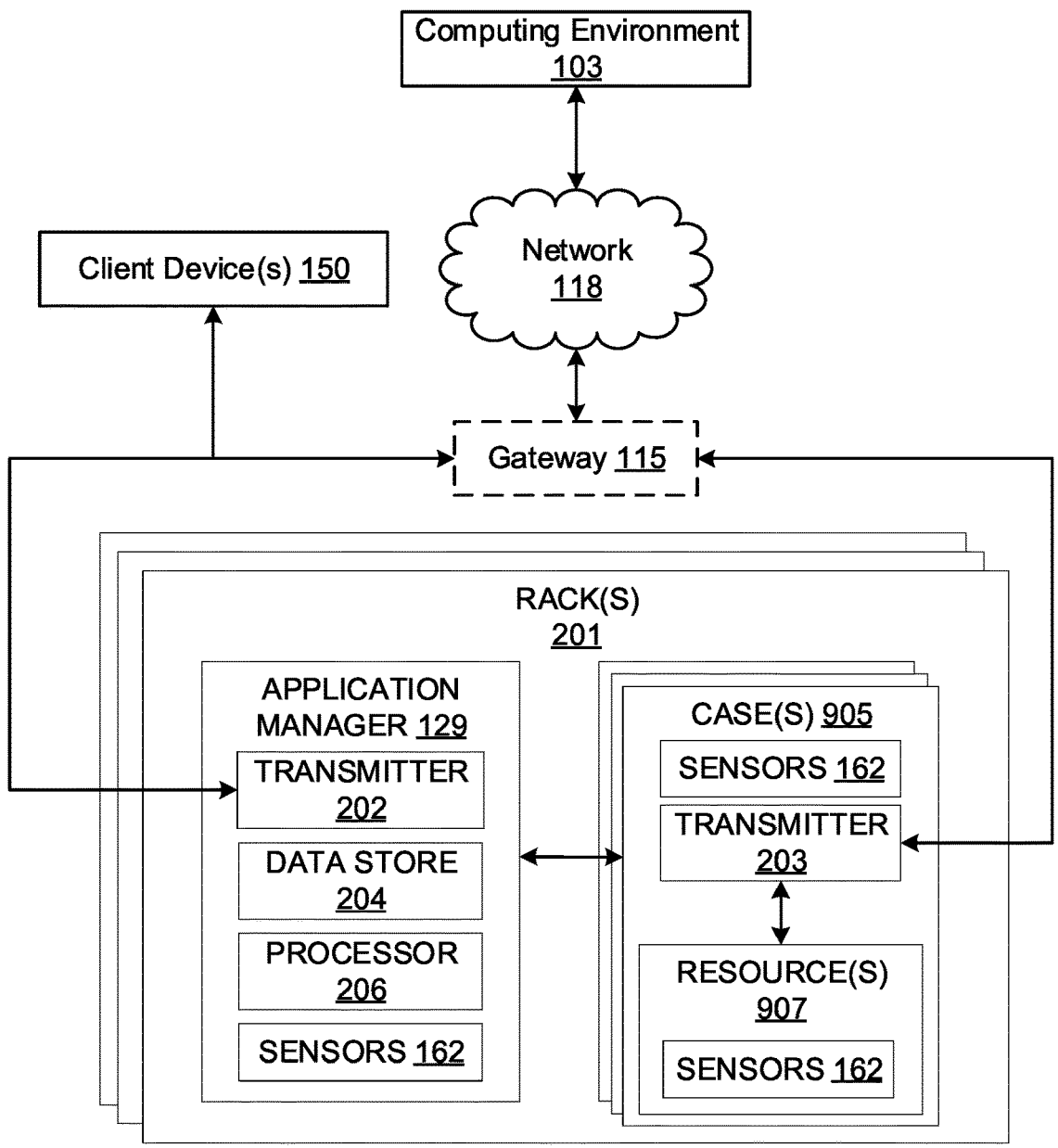
FIG. 2 is a diagram of the networked environment according to various example embodiments of the present disclosure.

Turning now to FIG. 2, shown is a drawing of an embodiment of the networked environment 100 with further details illustrated.

According to one embodiment, a rack 201 refers to a predetermined space or platform in or upon which resources 907 and/or cases 205 containing resources 907 are placed. A rack 201 can refer to a particular shelving location in a resource space 300 (see FIG. 3). In one example, a rack 201 comprises ceiling racking and resources 907 placed beneath are detected by one or more racking- or ceiling-mounted sensors 162. Alternatively, the rack 201 can refer to a pallet, or the like, that is placed into a particular shelving location in a resource space 300. In at least one embodiment, a rack 201 can refer to a combination of networked elements distributed between a particular shelving location and a pallet, or the like, placed therein. Therefore, one of ordinary skill will recognize that elements of racks 201 described herein may be distributed in a particular facility location, or within a pallet, or may be distributed between both.

A rack 201 can include an application manager 129 for controlling and executing various processes related to activities occurring in the rack 201. The application manager 129 can include a transmitter 202 for communicating with the computing environment 103. The application manager 129 can include a data store 204 for storing readings from sensors 162 and various metadata related to the operations of the sensors 162, such as, for example, current operating parameters of sensors 162. The application manager can include a processor 206 for processing readings received from sensors 162.

Each rack 201 can include a plurality of sensors 162. Additional sensors 162 may be placed near the rack 201 or otherwise throughout a resource space 300 or facility. Each sensor 162 can include a transmitter 203, or may be otherwise operative to communicate with a rack 201 and computing environment 103 via a transmitter 202 or other networked communications means. The sensors 162 can form a mesh network across the facility for providing meshed network communication capabilities. In some embodiments, sensors 162 (e.g., transmitters 902 thereof) can communicate with each other using a first wireless communication network 118 and communicate with gateway 215 using a second different wireless communication network or a wired communication network. As an example, a first frequency band can be used for the first wireless network and a second frequency band can be used for the second wireless network. Application managers 129 can communicate with sensors 162 using a different wireless communication network than that used by sensors 162 to communicate with each other.

The sensors 162 can be included in cases 905 and, in some embodiments, within individual resources 907. A sensor 162 can be any individual sensor or combination of sensors described herein. Each sensor 162 can be operative to detect one or more events including, but not limited to, proximity of a resource consumer (such as a facility worker) within a predetermined range of the rack 201, delivery of resources 907 and/or cases 205 to one or more racks 201, and consumption (e.g., by way of removal) of resources 907 and/or cases 205 from the rack 201. Each sensor 162 is operative to output readings to an application manager 129 and/or to a computing environment 103.

Sensors 162 can include, but are not limited to, proximity sensors, pressure sensors, radio frequency identification (RFID) sensors, acoustic sensors, light sensors, and other sensors. In one example, a sensor 162 includes a proximity sensor that detects a resource consumer upon the resource consumer moving within a predetermined range of a rack 201. In a second example, a sensor 162 includes an RFID reader that interrogates RFID tags affixed to one or more cases 205 and/or resources 907. In a third example, a sensor 162 includes an imaging device, such as a camera, that records and outputs activities occurring in and around the rack 201, thereby enabling the computing environment 103 to identify the activities based on one or more computer vision techniques. In a fourth example, a sensor 162 includes an acoustic sensor that emits and receives soundwaves used to determine a current quantity of resources 907 and/or cases 205 in a rack 201. In a fifth example, a sensor 162 includes a weight sensor that reports a current weight of a rack 201 or case 205, the current weight enabling detection and evaluation of resource delivery or consumption events (e.g., what quantity of a resource 907 was removed from a rack 201 or case 205). In a sixth example, a sensor 162 includes a camera for recording images or continuous video of a rack 201 and/or an area adjacent thereto.

A sensor 162 can include devices that transduce light-based phenomena into measureable electronic signals. The devices can include, but are not limited to, visible light sensors, infrared sensors, ultraviolet sensors, and other optics-based sensors. The devices can include emitters and/or detectors for measuring activities occurring in a rack 201 based on light interactions therein. In one example, a sensor 162 detects a change in light levels in a rack 201 in response to a case 205 and/or resource 907 being removed therefrom or deposited thereto. In another example, a sensor 162 detects a change in light levels (such as a breakage of one or more light beams) in response to a resource consumer moving within a predetermined proximity of the rack 201.

The sensors 162 can include devices that transduce sound energy into measurable electronic signals. The devices can include, but are not limited to, sound-recording devices, such as microphones, sound-based proximity sensors, and other sensing devices that operate based on measuring sound and/or mechanical or electrical activities induced by sound. In one example, a sensor 162 emits sound waves from a rack 201 and detects an increase in amplitude of a reflected sound waves in response to a resource consumer moving within a predetermined range of the rack 201. In another example, a plurality of sensors 162 arranged in a rack 201 detect increases in ambient sound levels in and around the rack 201. In the same example, the computing environment 103 (or the application manager 129) analyzes the recorded increases and the positions of the plurality of sensors 162 to determine activity occurring in the rack 201 (e.g., such as removal of a resource 907 therefrom).

The sensors 162 can include devices that transduce applied loads into measurable electronic signals. The devices can include one or more load cells for transducing applied forces (e.g., weight) into electrical output. The sensors 162 can include devices that emit and receive radio transmissions. The devices can include RFID antennae operative for interrogating RFID tags (including both passive and active RFID tags). The devices receive, store, and/or transmit information, such as identifiers, from RFID tags placed in racks 201, in cases 205, in resources 907, or on other elements of the resource space 300, such as, for example, from RFID tags placed on resource consumers therein.

The computing environment 103 can be coupled to a surveillance system that includes one or more sensors 162 comprising cameras. The resource application 126 can determine various activities such as a delivery event or consumption event by analyzing a video feed from the one or more cameras. In some embodiments, when a delivery or consumption event is received from an application manager 129, the resource application 126 can verify the event by analyzing a video feed. When a discrepancy exists, the resource application 126 can initiate an action. As an example, the resource application 126 can send a video recording for manual review. A user account can review the video recording to determine whether the detected delivery or consumption event occurred. If the user account indicates the event is not valid, the resource application 126 can cause various actions, such as preventing a reporting application 128 from transmitting communications related to the detected event or associated resources 907.

Figure 3A:
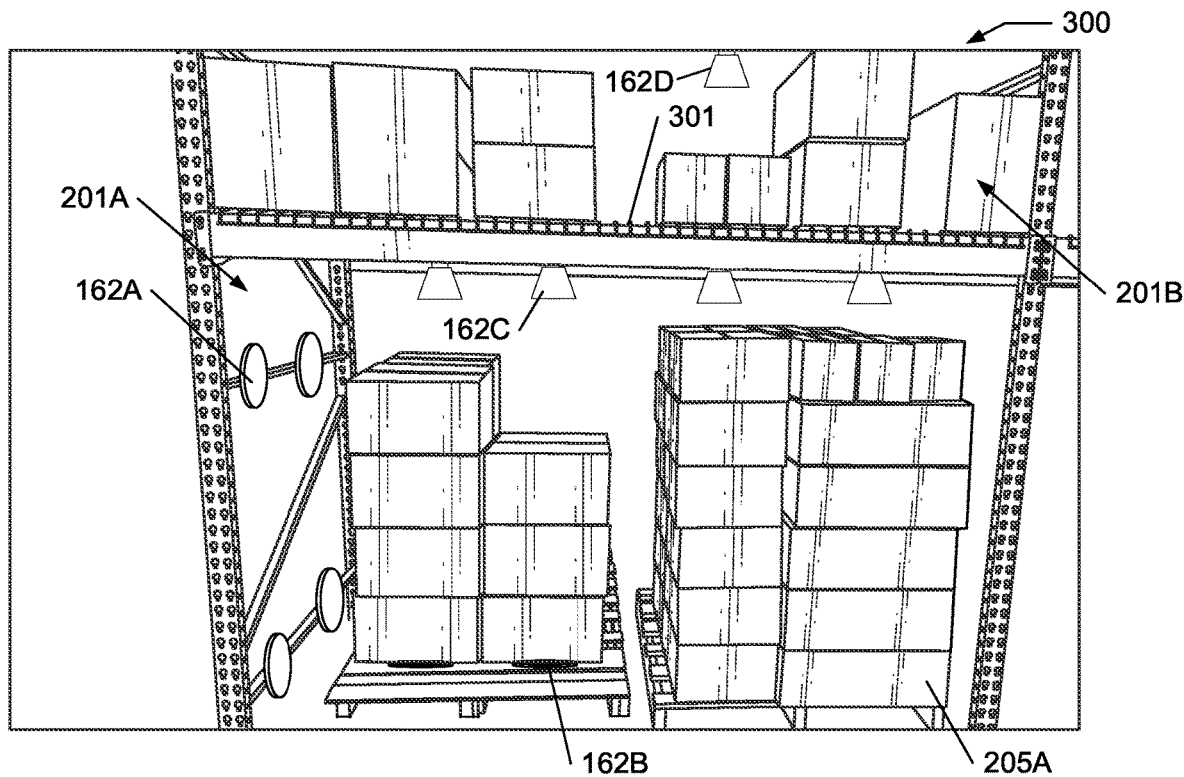
FIGS. 3A-D are drawings depicting an example scenario in a networked environment according to various example embodiments of the present disclosure.

Turning now to FIG. 3A, shown is a drawing of an exemplary resource space 300. According to one embodiment, the resource space 300 is a particular shelving space of a facility, such as a warehouse.

The resource space 300 can include one or more racks 201A, 201B, each rack 201 including one or more cases 205. The cases 205 can contain one or more resources 907, such as, for example, soaps and cleaning tools. The resource space 300 can include a plurality of sensors 162A-D.

The sensors 162 can be arranged above, on sides of, and/or beneath racks 201A, 201B, cases 205, and/or resources 907. In one example, sensors 162A include proximity and RFID sensing components, and are located at predetermined, increasing heights along sides of a rack 201A. In a second example, sensors 162C include cameras or other imaging components, and are located on an upper portion of the rack 201A, such as for example, on a top surface of the rack 201A that is superior to the cases 205 and/or resources 907. In a third example, sensors 162B include pressure sensors, and are arranged on a bottom surface of the rack 201A in a manner such that the sensors 162B are oriented inferior to cases 205 and/or resources 907 placed in the rack 201A.

In at least one embodiment, while not shown in FIG. 3A, one or more sensors 162 are included in a case 205 such that placement and removal of resources 907 therefrom is detectable via the one or more sensors 162. Furthermore, while the sensors 162A-D are shown as substantially circular or trapezoidal shapes for illustrative purposes in FIGS. 3A-D, one of ordinary skill in the art will recognize that the sensors 162A-D can include any suitable shapes of any suitable size or arrangement on or within the racks 201A, 201B, the cases 905, or the resource space 300. In one example, an RFID sensor 162A includes a generally circular shape and is sized to fit beneath cases 205 deposited in a rack 201A.

In various embodiments, while not shown in FIG. 3A, a sensor 162 comprises a sensing element, such as an antenna, that is ceiling-mounted and defines a cone of readable area. The readable area can include a predetermined range between about 3-15 feet, about 3-7 feet, about 7-11 feet, or about 11-15 feet. The readable area can be adjusted, for example, by increasing or decreasing power provided to the sensing element. For each rack 201, one or more sensors 162 can be installed above the rack 201 such that the rack 201 is contained within the readable area. In at least one embodiment, two or more sensors 162 are arranged such that the readable areas generated thereby do not overlap. In one or more embodiments, the detection of a resource 907 within a first readable area and, subsequently, at a second readable area defines a consumption event. In some embodiments, the sensor 162 is attached to racking of a ceiling. In one example, at least a portion of a rack 101 comprises racking of a ceiling and a sensor 162 is bracket-mounted to the at least one portion such that a sensing element (e.g., an antenna) is disposed over one or more resources 907.

The sensors 162A-D can operate in combination as discussed further herein. For example, a proximity-sensing sensor 162A can operate in combination with an RFID sensor 162E and an imaging sensor 162C to detect, a resource consumer approaching the resource space 300, rack 201A or 201B, a resource consumption event including removal of a resource 907 from the rack 201A by the resource consumer, and the identities (e.g., type, SKU, etc.) of the removed resource 907 and the resource consumer.

The racks 201A, 201B can include one or more sensing isolation elements 301 that provide a predetermined sensing radius for the sensors 162A-D in the rack 201. The sensing isolation element 301 can prevent sensing signals, such as radio signals, from reaching nearby racks 201, thereby reducing a likelihood of false event detection. In one example, a sensing isolation element 301 is placed in between stacked racks 201, thereby preventing sensors 162 in the inferior rack 201 from detecting resource delivery and removal events occurring in the superior rack 201 (and vice versa). The sensing isolation element 301 can include electromagnetic shielding, such as, for example, metallic screens or sheets.

Figure 3B:
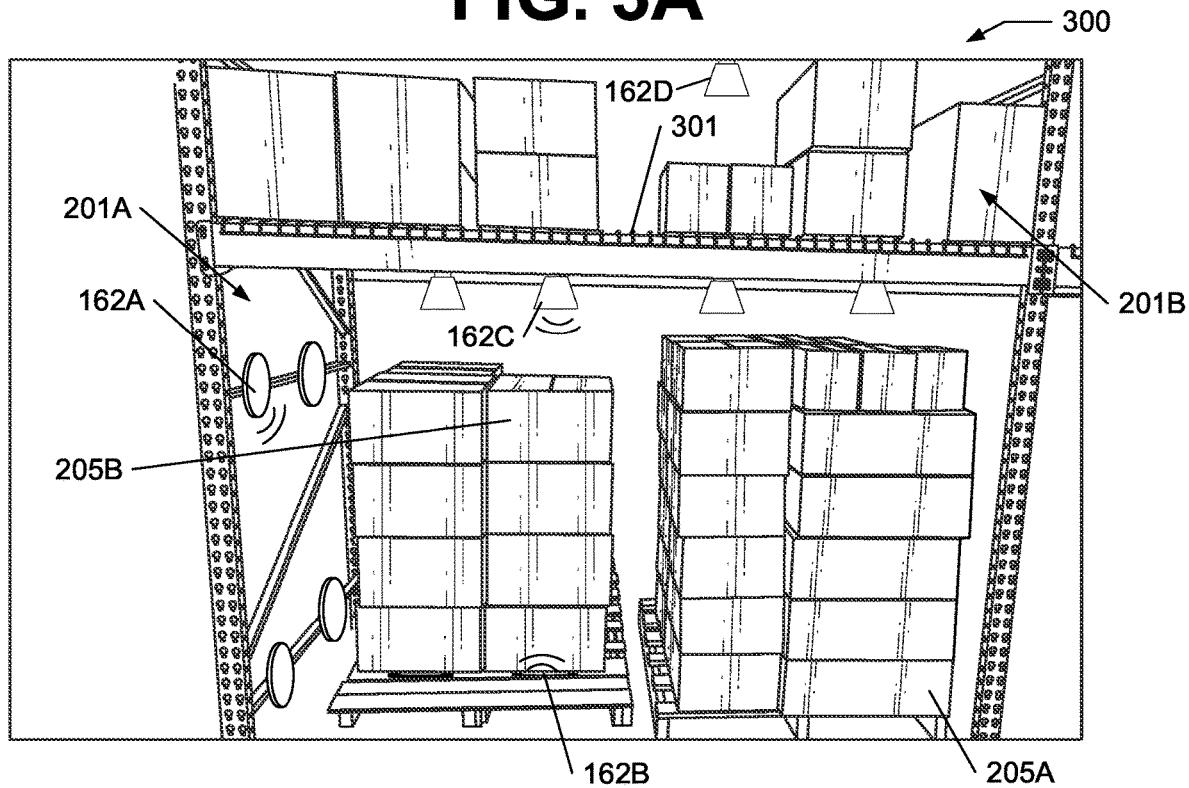

Turning now to FIG. 3B, shown is an embodiment of the resource space 300 during a delivery event, the delivery event including the delivery to the rack 201A of a case 205B including one or more resources 907B. The sensors 162A can detect when a resource consumer moves within a predetermined proximity of the resource space 300 or rack 201A. In one example, the sensors 162A can interrogate an RFID tag carried by the resource consumer, and may obtain an identifier via the interrogation that uniquely identifies the resource consumer. The resource consumer can deliver a case 205B to the rack 201A. The sensors 162A can interrogate an RFID tag on the case 205B to detect delivery thereof, and may obtain one or more identifiers via the interrogation including, but not limited to, a case identifier, a resource identifier (e.g., associated with resources 907 in the case 205B), and other identifiers.

The sensors 162C can record activity occurring in the resource space 300 and a computing environment 103 can determine from the recorded activity that the case 205B has been delivered to the rack 201A. The sensors 162B can detect that a weight of the rack 201A has increased and a computing environment 103 can determine that a delivery event has occurred and, further, that a particular quantity of resources 907 has been delivered based on the detected weight increase and a predetermined weight of an individual resource 907 or case 205B thereof.

In response to the determination of a delivery event, the computing environment 103 can cause a variety of actions. For example, a rack manager 124 can update information associated with the rack 201A. For example, the rack manager 124 can cause rack data 136 to be updated to reflect the delivery of resources 907 via the case 205B. In another example, a resource application 126 update resource data 133 by incrementing one or more resource counters to reflect the delivery of the resources 907. In another example, a reporting application 128 can generate and transmit a delivery event notification to one or more user accounts, such as, for example, a user account associated with an entity controlling a facility in which the resource space 300 is located.

Figure 3C:
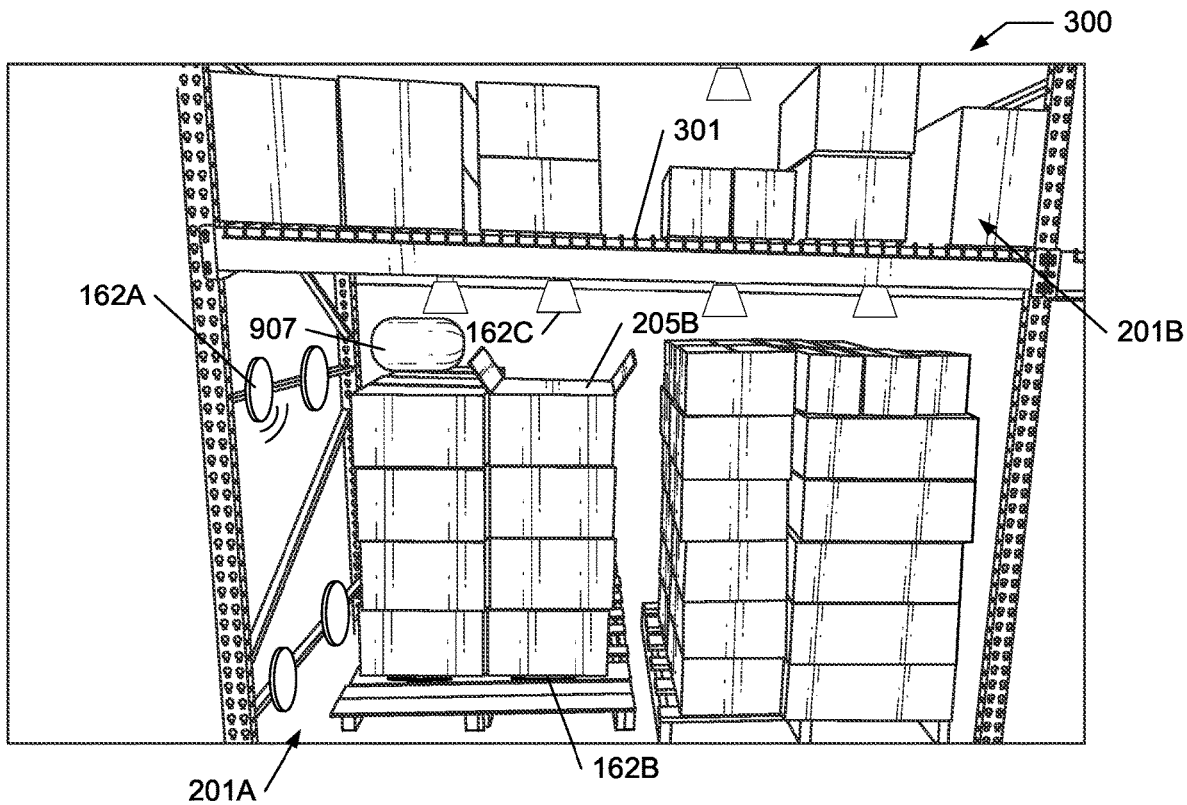

Turning now to FIG. 3C, shown is an embodiment of the resource space 300 during a consumption event, the consumption event including the removal of a resource 907 from the case 205B. The sensors 162A can detect when a resource consumer moves within a predetermined proximity of the resource space 300 or rack 201A. The resource consumer can remove the resource 907 from the case 205B. The sensors 162A can interrogate RFID tags on the resource 907 and/or case 205B to detect the removal. The sensors 162A may obtain a resource identifier and the case identifier for the case 205B.

The sensors 162C can record activity occurring in the resource space 300 and a computing environment 103 can determine from the recorded activity that the resource 907 has been removed from the case 205B by the resource consumer. The sensors 162B can detect that a weight of the rack 201A has decreased and a computing environment 103 can determine that a consumption event has occurred and, further, that a particular quantity of resources 907 has been consumed based on the detected weight decrease. In some embodiments, the computing environment 103 may not determine a consumption event has occurred until determining that the resource 907 has been removed from the rack 201A.

In response to the determination of a consumption event, the computing environment 103 can cause a variety of actions. For example, the rack manager 124 can cause rack data 136 to be updated to reflect the removal of the resource 907 from the case 205B. In another example, a resource application 126 update resource data 133 by decrementing one or more resource counters to reflect the delivery of the resource 907 from the case 20B. In another example, a reporting application 128 can generate and transmit a consumption event notification to one or more user accounts, such as, for example, a user account associated with the resource consumer.

Figure 3D:
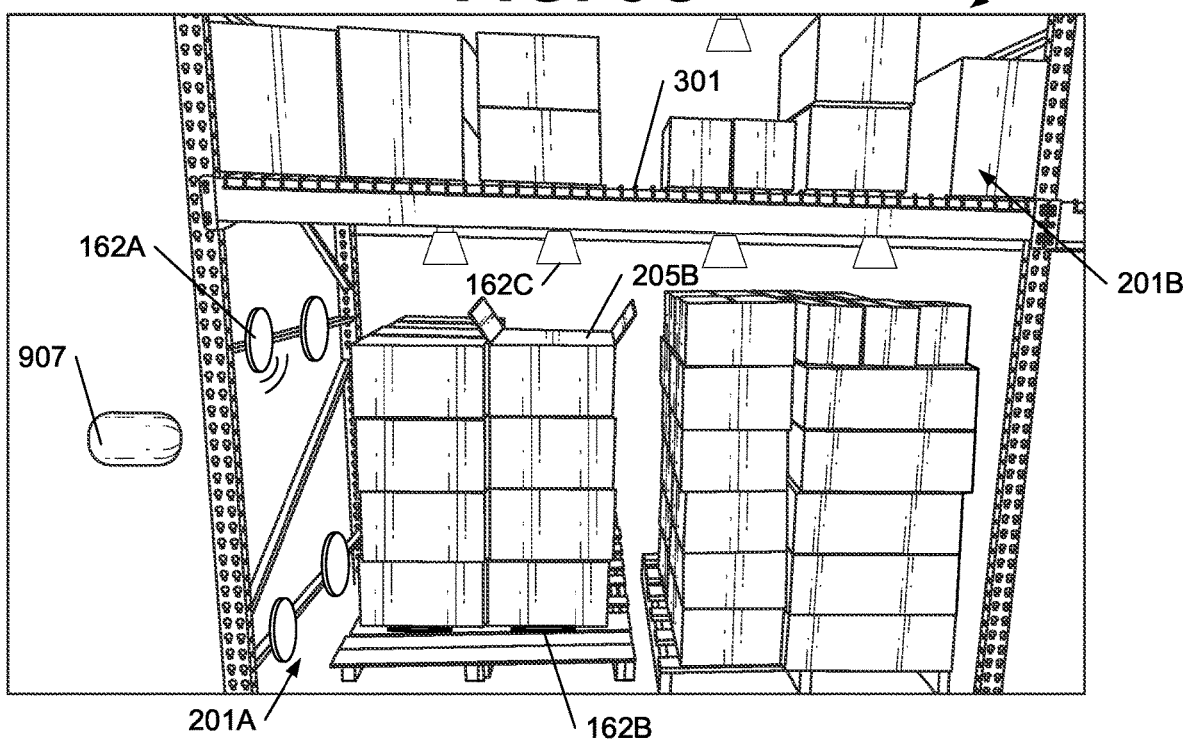

Turning now to FIG. 3D, shown is an embodiment of the resource space 300 during a consumption event, the consumption event including the removal of a resource 907 from the rack 201A. The sensors 162A can detect when the resource 907 is moved beyond a predetermined proximity of the resource space 300 or rack 201A.

The sensors 162C can record activity occurring in the resource space 300 and a computing environment 103 can determine from the recorded activity that the resource 907 has been removed from the rack 201A by a particular resource consumer. The sensors 162B can detect that a weight of the rack 201A has decreased and a computing environment 103 can determine that a consumption event has occurred and, further, that a particular quantity of resources 907 has been consumed based on the detected weight decrease.

In response to the determination of a consumption event, the computing environment 103 can cause a variety of actions. For example, the rack manager 124 can cause a user interface 159 to be updated to reflect a decremented quantity of resources 907 in the rack 201A. In another example, a resource application 126 can determine that the decremented quantity of resources 907 in the rack 201A is below a predetermined threshold quantity. In another example, a reporting application 128 can generate and transmit an alert, a request for payment, and/or a request for delivery of additional resources 907 to one or more user accounts, such as, for example, a user account associated with the entity consuming the removed resource 907.

Figure 4:
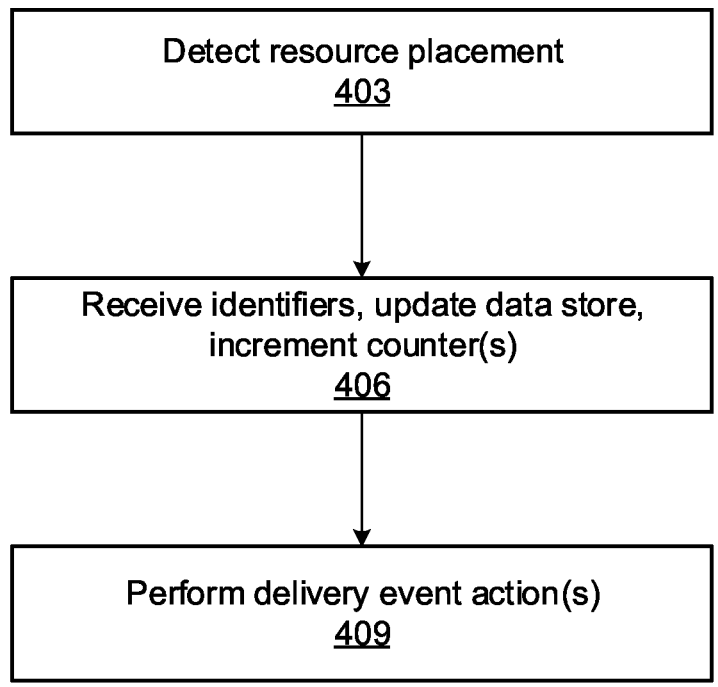
FIG. 4 is a flowchart of an exemplary resource delivery process according to various example embodiments of the present disclosure.
Figure 5:
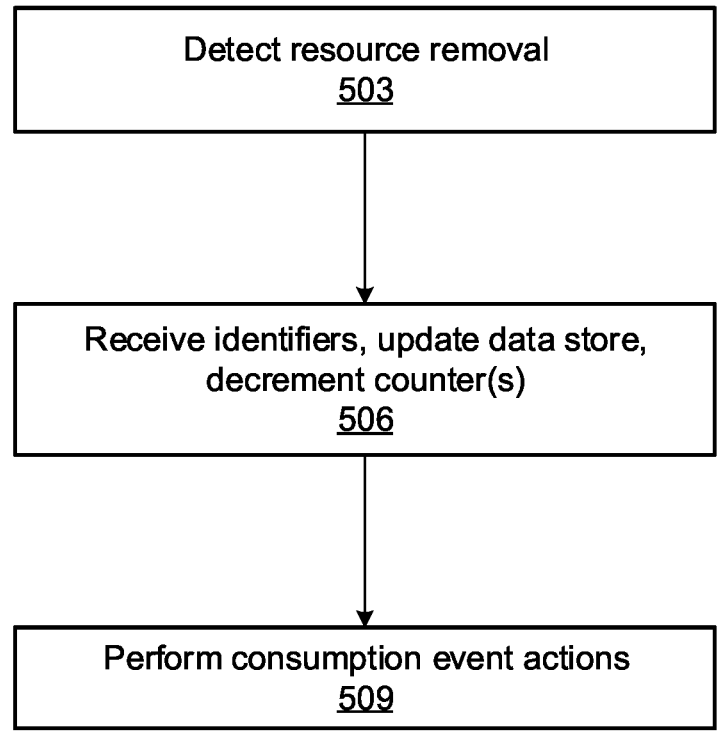
FIG. 5 is a flowchart of an exemplary resource consumption detection process according to various example embodiments of the present disclosure.

Before turning to the process flow diagrams of FIGS. 4 and 5, it is noted that embodiments described herein may be practiced using an alternative order of the steps illustrated in FIGS. 4 and 5. That is, the process flows illustrated in FIGS. 4 and 5 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

With reference to FIG. 4, shown is a resource delivery process 400. At step 403, placement of a resource 907 into a rack 201 is detected via one or more sensors 162. The detection can include multiple sensing modes. For example, a first sensor 162 can detect movement of a resource consumer within a proximity of the rack 201. In the same example, the proximity detecting can cause a second sensor 162 to interrogate an RFID tag of the resource consumer and an RFID tag of the resource 907. In another example, a first sensor 162 can record imagery of the rack 201A and the computing environment 103 can determine that the imagery is dissimilar to temporally preceding imagery. In the same example, the determination of dissimilar imagery can cause a second sensor 162 to interrogate RFID tags of resources 907 in the rack 201. In alternate embodiments, placement of a resource 907 is detected in a single sensing mode.

At step 406, one or more identifiers are received and one or more counters are updated based on the received identifiers. The one or more identifiers can include, but are not limited to, a resource 907 identifier, a rack 201 identifier, a case 205 identifier (e.g., if the placed resource 907 is contained therein), and a resource consumer identifier. A plurality of resource 907 identifiers may be received, for example, if a plurality of resources 907 are placed in the rack 201 and/or if RFID tags of all resources 907 are obtained via interrogation. Based on the received identifiers, resource data 133 and rack data 136 are updated.

In one example, the resource data 133 is updated to include the identifier of the newly placed resource 907. In another example, a delivery table is updated to indicate that a scheduled resource delivery event has occurred. In another example, a table of current resources included in the rack data 136 is updated to include the resource identifier, thereby providing up-to-date tabulation of resources 907 being stored in the rack 201.

In one example, a resource availability counter specific to the placed resource 907 is incremented. In another example, a resource capacity counter associated with the rack 201 is incremented (e.g., to reflect a current amount of resources 907 stored therein). In another example, received resource identifiers are compared to a current list of resource identifiers associated with a previous interrogation of resources 907 in the rack 201. In the same example, the comparison can determine which received resource identifier are associated with a newly delivered resource 907.

Based on the one or more received identifiers and/or readings from the one or more sensors 162, a delivery event is determined to have occurred. In an exemplary scenario, at a first time interval, a sensor 162 interrogates a region within a rack 201. In response to the interrogation, the rack manager 124 receives a particular identifier with which a particular resource 907 is associated, and a resource application 126 timestamps and records the identifier. A reading threshold of predetermined magnitude (e.g., 1 hour, 24 hours, etc.) is configured. At a second time interval subsequent to the first time interval, the region with the rack 201 is interrogated and the particular identifier is not received. The resource application 126 computes a difference between the second time interval and the first time interval (e.g., or an intervening time interval therebetween at which the particular was successfully read). The resource application 126 compares the difference is to the reading threshold and generates a determination. In response to determining that the difference meets the predetermined magnitude, the particular resource 907 is determined to be consumed.

At step 409, the process includes performing one or more actions based on the detected delivery of the resource 907. The one or more actions can include, but are not limited to, transmitting notifications or alerts indicating the delivery event, computing a proposed scheduling for a future delivery event, generating a request for payment for the delivered resource 907, and other actions.

In one example, an alert is transmitted to a client device 150 associated with the rack 201. The alert can cause the client device 150 to render an inventory dashboard on a user interface 159 including a current tabulation of resources 907 in the rack 201, an identification of the delivered resource 907, a cost of the delivered resource 907, an identification of the resource consumer 907 that placed the resource 907, and various other indications or information. The user interface 159 can include various prompts requesting a variety of actions, such as, for example, confirming delivery of the resource 907. The user interface can include selectable options that, upon selection, cause one or more actions to be performed (e.g., in the computing environment 103). The selectable options can include, for example, an option to request additional information, a request for an estimation of when additional delivery events may be required (e.g., based on a computed estimate of resource consumption rates), and other options.

In another example, a resource delivery and consumption history is retrieved (e.g., from the resource data 133 and/or rack data 136). The resource delivery and consumption history can include timestamped quantities of resources 907 delivered into and consumed from one or more racks 201. The resource delivery and consumption history can be used to train a machine learning model for predicting a likely date by which additional resources 907 should be delivered. For example, a training dataset can include a history of resource delivery events and related data, and a machine learning model can be trained using the training dataset to predict the occurrence of consumption events (which may be expressed as a consumption rate) and output a ranked list of candidate dates for scheduling a future delivery event. In the same example, the prediction can be rendered automatically (or upon request) on a user interface 159 of an associated client device 150. The user interface 159 can include selectable fields for selecting one or more of the candidate dates, where a selection thereof causes an automated scheduling of a delivery event on the selected candidate date.

With reference to FIG. 5, shown is a resource consumption process 500. At step 503, removal of a resource 907 from a rack 201 is detected via one or more sensors 162. Detection can include image-based, RFID-based, pressure-based, or acoustic-based sensing modes, or combinations thereof. In one example, a sensor 162A detects movement of a resource 907 beyond a predetermined proximity of a case 205 or the rack 201. In another example, a sensor 1628 detects a reduction in weight or pressure commensurate to a weight of the resource 907, thereby indicating the removal thereof. In another example, a sensor 162C records imagery of the rack 201 and the computing environment 103 processes the imagery and determines the removal of the resource 907 therefrom.

At step 506, one or more identifiers are received and one or more counters are updated based on the received identifiers. The one or more identifiers can include, but are not limited to, a resource 907 identifier, a rack 201 identifier, a case 205 identifier (e.g., if the placed resource 907 is contained therein), and a resource consumer identifier. A plurality of resource 907 identifiers may be received, for example, if a plurality of resources 907 are removed from the rack 201 and/or if RFID tags of all resources 907 are obtained via interrogation. Based on the received identifiers, resource data 133 and rack data 136 are updated.

In one example, a resource consumption counter stored in the resource data 133 is incremented based on the determined quantity of the resource 907 removed. In another example, a resource availability counter is decremented based on the determined quantity. In another example, a consumption table is updated to indicate that a scheduled or predicted resource consumption event has occurred. In another example, a table of current resources included in the rack data 136 is updated to exclude the resource identifier, thereby providing up-to-date tabulation of resources 907 being stored in the rack 201.

Based on the one or more received identifiers and/or readings from the one or more sensors 162, a consumption event is determined to have occurred. In one example, at a first time interval, a particular identifier for a resource 907 is received during a delivery event to a rack 201. A threshold duration (e.g., of about 60 minutes, 24 hours, etc.) is configured that corresponds to an amount of time transpiring between interrogations resulting in the receipt of the particular identifier. At a second time interval subsequent to the first time interval, an interrogation of the rack 201 is performed, readings are received, and the particular identifier is determined to not be included in the readings. The resource application 126 computes a difference between the second time interval and the first time interval (e.g., or an intervening time interval therebetween at which the particular was successfully read). The resource application 126 compares the difference is to the threshold duration and generates a determination. In response to determining that the difference meets the threshold duration, the resource 907 is determined to be consumed.

At step 509, the process includes performing one or more actions based on the detected consumption of the resource 907. The one or more actions can include, but are not limited to, updating an inventory dashboard, transmitting notifications or alerts indicating the consumption event, computing a proposed scheduling for a future delivery event, generating a request for payment for the consumed resource 907, and other actions.

In one example, an alert is transmitted to a client device 150 associated with the rack 201. The alert can cause the client device 150 to render a user interface 159 including a current tabulation of resources 907 in the rack 201 and a request for payment generated based on a resource consumption counter. In some embodiments, a request for payment is generated only upon determining that the incremented resource consumption counter has risen above a threshold level or upon determining that the decremented resource availability counter has fallen beneath a threshold level.

The inventory dashboard rendered on the user interface 159 can include various prompts requesting a variety of actions, such as, for example, payment, scheduling of resource delivery events, and other actions. The user interface can include selectable options that, upon selection, cause one or more actions to be performed (e.g., in the computing environment 103). The selectable options can include, for example, an option to request additional information, a request for an estimation of when additional delivery events may be required (e.g., based on a computed estimate of resource consumption rates), and other options.

In another example, a resource delivery and consumption history is retrieved (e.g., from the resource data 133 and/or rack data 136). The resource delivery and consumption history can be used to generate a training set and train one or more machine learning models to generate candidate dates for scheduling of subsequent delivery events based on past resource consumption rates and other factors (e.g., time of the year, cost of resources 907, etc.). In some embodiments, a first iteration of a trained machine learning model already exists and the newly updated delivery and consumption history is used to test the validity of the first model iteration. In one example, if the computed validity of the first model iteration falls beneath a threshold value, the model is retrained using an updating training set (e.g., reflecting the consumption event and other updated information) until a secondary model iteration satisfies the validity threshold. In the same example, the secondary model iteration is used to generate a new set of candidate dates for delivery events. The various machine learning models can generate other outputs including, but not limited to, determinations of resource waste or overuse, identifications of potential resource redistributions (e.g., based on demonstrated need across a plurality of resource spaces 300 or facilities), and other outputs.

Figure 6:
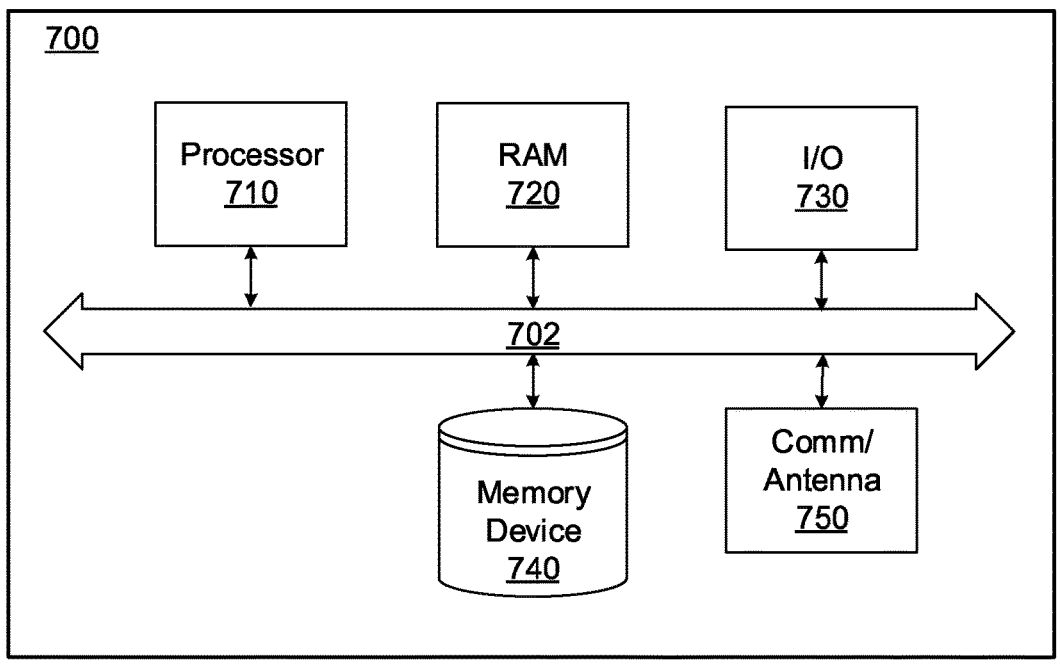
FIG. 6 is a schematic block diagram that illustrates an example hardware diagram of a device, such as a sensor, employed in the networked environment of FIGS. 1 and 2 according to various example embodiments of the present disclosure.

Turning to FIG. 6, an example hardware diagram of a beacon device, such as beacon device 206a or a client device 209 is illustrated. The device 700 includes a processor 710, a Random Access Memory ("RAM") 720, an Input Output ("I/O") interface 730, a memory device 740, and a communication interface/antenna 750. The elements of the device 700 are communicatively coupled via a bus 702.

The processor 710 comprises any well-known general purpose arithmetic processor or Application Specific Integrated Circuit ("ASIC"). The processor 710 may include a System on Chip (SOC) processor, for example, an nRF52840 SOC from Nordic Semiconductor. The RAM 720 comprise any well-known random access or read only memory device that stores computer-readable instructions to be executed by the processor 710. The memory device 740 stores computer-readable instructions thereon that, when executed by the processor 710, direct the processor 710 to execute various aspects of the present disclosure described herein. When the processor 710 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 740 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The communication interface/antenna 750 comprises hardware interfaces to communicate over data networks. The I/O interface 730 comprises device input and output interfaces such as keyboard, pointing device, display, communication, and other interfaces. The bus 702 electrically and communicatively couples the processor 710, the RAM 720, the I/O interface 730, the memory device 740, and the communication interface/antenna 750, so that data and instructions may be communicated among them.

In operation, the processor 710 is configured to retrieve computer-readable instructions stored on the memory device 740, the RAM 720, the ROM, or another storage means, and copy the computer-readable instructions to the RAM 720 or the ROM for execution, for example. The processor 710 is further configured to execute the computer-readable instructions to implement various aspects and features of the present disclosure. For example, the processor 710 may be adapted and configured to execute the processes described above with sensors 162, a client device 150, and an application manager 129, among others.

Figure 7:
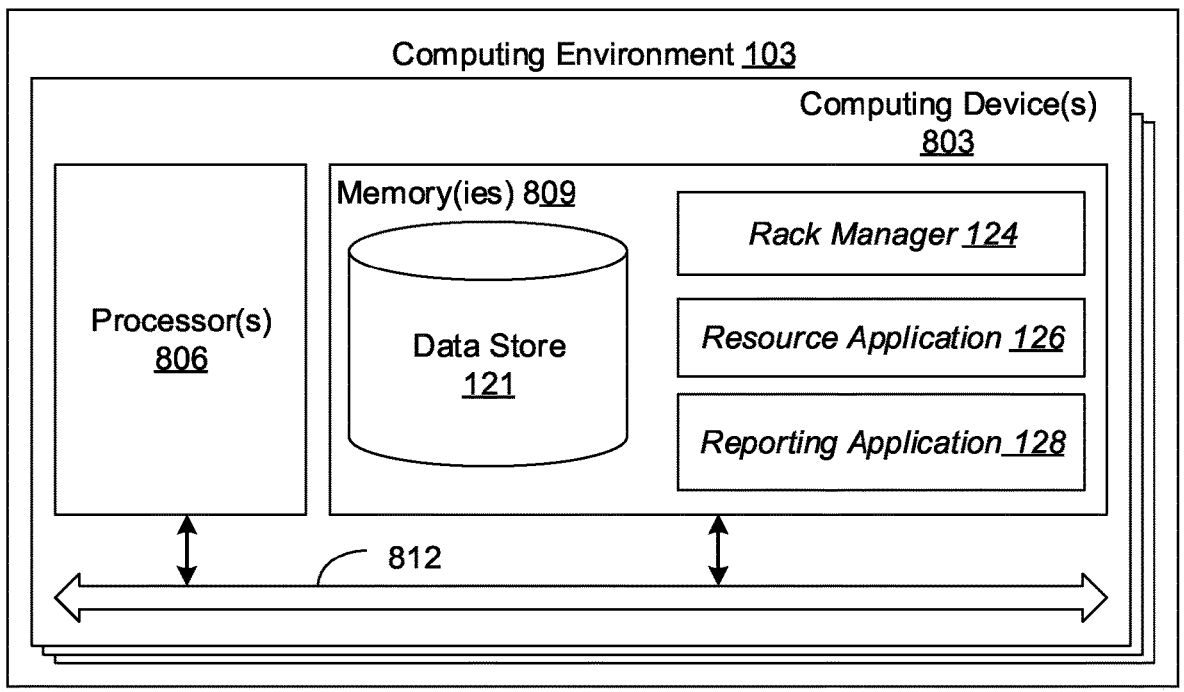
FIG. 7 is a schematic block diagram that illustrates an example computing environment employed in the networked environment of FIGS. 1 and 2 according to various example embodiments of the present disclosure.

With reference to FIG. 7, shown is a schematic block diagram of the computing environment 103 according to an embodiment of the present disclosure. The computing environment 103 includes one or more computing devices 803. Each computing device 803 includes at least one processor circuit, for example, having a processor 806 and a memory 809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are the rack manager 124, the resource application 126, and the reporting application 128, and potentially other applications. Also stored in the memory 809 may be a data store 121 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

According to various embodiments, the transmitters 202, 203 and other transmitting elements described herein communicate with gateway 115 using wireless communication, such as for example, Wi-Fi (802.11) or mobile data communication module (3G/LTE, GSM, etc.), Bluetooth, Bluetooth Low Energy (BLE 5.0), NFC, Zigbee, Z-wave, IR, etc. In various embodiments, the transmitters 202, 203 use Bluetooth 5.0 LE (Low Energy) technology. Bluetooth 5.0 provides the ability for the BLE devices to communicate via a mesh, thus eliminating the need for a secondary network to provide communication. The meshing capability allows the sensors 162 to communicate with each other, with the application manager 129, and with the computing environment 103 by transmitting, processing, and re-transmitting data across a sequence of sensors 162 and transmitters 202, 203 thereof. The data can intelligently route back to a single point of egress, such as the gateway 215, allowing for communication to the computing environment 103. In various embodiments, the sensors 162 use Bluetooth 5.0 spread spectrum technology to voice co-channel interference. The meshing capability can facilitate an endless number of devices, such as sensors 162, to communicate with each other without the requirement of a secondary network. Additional sensors 162 can be added as long as the additional sensors 162 are in proximity to sensors 162. The meshing of sensors 162 can allow for routing of communications across a plurality of racks 201, only a subset of which may be operative to communicate directly with the computing environment 103 via the gateway 215. In some embodiments, the racks 201 can include the mesh network capability directly. In these embodiments, as long as the furthest rack 201 is within range of another rack 201 or sensor 162 closer to the gateway 115, communication with the computing environment 103 is achievable and additional sensors or racks 201 can be added.

In some embodiments, various other devices apart from those described above can utilize the mesh network created by the sensors 162 to communicate with computing environment 103. Other Internet of Things (IoT) devices may communicate with computing environment 103. For example, there may be machinery being used in the facility that may include one or more IoT device. The IoT devices may use the mesh network to communicate with the computing environment 103.

Although the rack manager 124, the resource application 126, and the reporting application 128, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the rack manager 124, the resource application 126, and the reporting application 128, and/or the client device 150. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 4 or 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Various network security techniques can be utilized to ensure that data communication between racks 201, sensors 162, gateway 215, client devices 150, and the computing environment 103 is secure. For example, communication between the various devices can be encrypted using 128-bit AES encryption. Additionally, the racks 201 and sensors 162 can utilize frequency hopping techniques to avoid the capture of wireless data. The rack manager 124 can maintain a list of authorized devices such as client devices 150 and sensors 162. If a device that is not authorized attempts to communicate with the networked environment 100, the rack manager 124 can cause the reporting application 128 to generate an alarm or alert.

In various embodiments, racks 201, sensors 162, and gateway 115 have authentication capabilities to ensure only authorized devices are added to the network. On chip encryption can be utilized to encrypt all network traffic to avoid data being compromised if hardware is stolen. Fast roaming/pairing capability between racks 201, sensors 162, and gateway devices 115 that utilize Bluetooth further adds to security.

Also, any logic or application described herein, including the rack manager 124, the resource application 126, and the reporting application 128, that comprises software or code can be embodied in any non-transitory computer-readable medium for use by or in connection with an instruction execution system, such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the rack manager 124, the resource application 126, and the reporting application 128, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices 803 in the same computing environment 103.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phases are not generally intended to, and should not, imply that certain embodiments require at least one of either X, Y, or Z to be present, but not, for example, one X and one Y. Further, such phases should not imply that certain embodiments require each of at least one of X, at least one of Y, and at least one of Z to be present.

According to a first aspect, a resource consumption system, comprising: A) a plurality of resources positioned within at least one rack; B) at least one sensor configured to detect removal of an amount of the plurality of resources from the respective rack; C) at least one transmitter configured to transmit a notification based on the at least one sensor detecting the removal of the amount of resources, wherein the notification comprises a resource identifier, an entity identifier, and the amount of the plurality of resources; and D) at least one computing device configured to: 1) compute an amount based on the resource identifier and the amount of resources; 2) generate a request based on the notification, wherein the request comprises the resource identifier, the entity identifier, and the amount; and 3) transmit the request to an entity associated with the entity identifier.

According to a further aspect, the resource consumption system of the first aspect or any other aspect, further comprising a second plurality of resources positioned at a region adjacent to the at least one rack, wherein the at least one sensor is configured to detect removal of a second amount of the second plurality of resources from the region.

According to a further aspect, the resource consumption system of the first aspect or any other aspect, further comprising a data store configured to record the amount of resources based on the resource identifier and the entity identifier.

According to a further aspect, the resource consumption system of the first aspect or any other aspect, wherein the at least one computing device is further configured to: A) determine that the amount of resources meets a predetermined consumption threshold; and B) based on determining that the amount of resources meets the predetermined consumption threshold, generate and transmit the request the entity associated with the entity identifier.

According to a further aspect, the resource consumption system of the first aspect or any other aspect, wherein the at least one computing device is further configured to: A) increment a resource consumption counter based on the amount of resources, the resource identifier, and the entity identifier; and B) store the incremented resource consumption counter based on the amount of resources, the resource identifier, and the entity identifier.

According to a further aspect, the resource consumption system of the first aspect or any other aspect, wherein the at least one computing device is further configured to: A) determine that the incremented resource consumption counter is equal to or greater than a predetermined resource consumption counter threshold; and B) based on determining that the incremented resource consumption counter is equal to or greater than the predetermined resource consumption counter threshold: 1) generate a resource request based on the resource identifier and the entity identifier; and 2) transmit the resource request to the entity.

According to a further aspect, the resource consumption system of the first aspect or any other aspect, wherein the resource request comprises a second amount based on the resource identifier.

According to a further aspect, the resource consumption system of the first aspect or any other aspect, wherein the second amount is further based on the at least one computing device determining a particular period of time required for the resource consumption counter to become equal to or greater than the predetermined resource consumption counter threshold.

According to a second aspect, a resource consumption method, comprising: A) positioning a plurality of resources within at least one rack; B) detecting, via at least one sensor, removal of an amount of the plurality of resources from the respective rack; C) transmitting, via at least one transmitter, a notification based on the at least one sensor detecting the removal of the amount of resources, wherein the notification comprises a resource identifier, an entity identifier, and the amount of the plurality of resources; D) computing, via at least one computing device, an amount based on the resource identifier and the amount of resources; E) generating, via the at least one computing device, a request based on the notification, wherein the request comprises the resource identifier, the entity identifier, and the amount; and F) transmitting, via the at least one computing device, the request to an entity associated with the entity identifier.

According to a further aspect, the resource consumption method of the second aspect or any other aspect, further comprising recording the amount of resources based on the resource identifier and the entity identifier.

According to a further aspect, the resource consumption method of the second aspect or any other aspect, further comprising: A) determining that the amount of resources meets a predetermined consumption threshold; and B) transmitting the request to the entity associated with the entity identifier based on determining that the amount of resources meets the predetermined consumption threshold.

According to a further aspect, the resource consumption method of the second aspect or any other aspect, further comprising: A) incrementing, via the at least one computing device, a resource consumption counter based on the amount of resources, the resource identifier, and the entity identifier; and B) storing, via the at least one computing device, the incremented resource consumption counter based on the amount of resources, the resource identifier, and the entity identifier.

According to a further aspect, the resource consumption method of the second aspect or any other aspect, further comprising: A) determining, via the at least one computing device, that the incremented resource consumption counter is equal to or greater than a predetermined resource consumption counter threshold; and B) based on determining that the incremented resource consumption counter is equal to or greater than the predetermined resource consumption counter threshold: 1) generating a resource request based on the resource identifier and the entity identifier; and 2) transmitting the resource request to the entity.

According to a further aspect, the resource consumption method of the second aspect or any other aspect, further comprising determining a particular period of time required for the resource consumption counter to become equal to or greater than the predetermined resource consumption counter threshold.

According to a third aspect, a resource consumption system, comprising: A) a plurality of cases positioned within a rack positioned at a location, wherein each of the plurality of cases comprises a plurality of resources; B) the rack comprising: 1) at least one sensor configured to detect removal of an amount of the plurality of resources from one of the plurality of cases; 2) at least one transmitter configured to transmit a notification to a computing environment based on the at least one sensor detecting the removal of the amount of resources, wherein the notification comprises a resource identifier, an entity identifier, and the amount of the plurality of resources; and 3) at least one sensing isolation element; and C) the computing environment comprising: 1) at least one computing device configured to compute an amount based on the resource identifier and the amount of resources; and 2) at least one server configured to: i) generate a request based on the notification, wherein the request comprises the resource identifier, the entity identifier, and the amount; and ii) transmit the request to an entity associated with the entity identifier.

According to a further aspect, the resource consumption system of the third aspect or any other aspect, wherein at least a portion of the rack is integrated into a ceiling.

According to a further aspect, the resource consumption system of the third aspect or any other aspect, wherein the at least one computing device is further configured to: 1) determine that the amount of resources meets a predetermined consumption threshold; and 2) based on determining that the amount of resources meets the predetermined consumption threshold, cause the at least one server to generate and transmit the request.

According to a further aspect, the resource consumption system of the third aspect or any other aspect, wherein the at least one computing device is further configured to: 1) increment a resource consumption counter based on the amount of resources, the resource identifier, and the entity identifier; and 2) store the incremented resource consumption counter based on the amount of resources, the resource identifier, and the entity identifier.

According to a further aspect, the resource consumption system of the third aspect or any other aspect, wherein the at least one computing device is further configured to: A) determine that the incremented resource consumption counter is equal to or greater than a predetermined resource consumption counter threshold; and B) based on determining that the incremented resource consumption counter is equal to or greater than the predetermined resource consumption counter threshold: 1) generate a resource request based on the resource identifier and the entity identifier; and 2) transmit the resource request to the entity.

According to a further aspect, the resource consumption system of the third aspect or any other aspect, wherein the resource request comprises a second amount based on the resource identifier and the at least one computing device determining a particular period of time required for the resource consumption counter to become equal to or greater than the predetermined resource consumption counter threshold.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

Therefore, at least the following is claimed:

1. A resource consumption system, comprising:
   at least one sensor configured to read a plurality of measurements related to a plurality of resources positioned within at least one rack;
   at least one computing device in communication with the at least one sensor, the at least one computing device being configured to:
      record imagery of the at least one rack;
      determine that the imagery is dissimilar to at least one preceding imagery of the at least one rack;
      interrogate RFID tags responsive to determining that the imagery is dissimilar;
      receive the plurality of measurements related to the plurality of resources positioned within the at least one rack in a facility associated with an entity based on interrogating the RFID tags;
      determine a quantity of resources removed from the plurality of resources and a resource identifier based on the plurality of measurements;
      compute an amount based on the resource identifier and the quantity of resources;
      generate a request comprising the resource identifier, the quantity of resources removed, and the amount; and
      transmit the request to an entity associated with the at least one rack in the facility.

2. The system of claim 1, wherein the at least one computing device is further configured to:
   read, via the at least one sensor, measurements indicating a plurality of additional resources moved into position within the at least one rack in the facility; and
   determine that a delivery event occurred based on the measurements.

3. The system of claim 2, wherein the at least one computing device is further configured to update inventory information associated with the at least one rack responsive to determining that the delivery event occurred.

4. The system of claim 2, wherein the at least one computing device is further configured to interrogate a respective RFID tag carried by each of the plurality of additional resources to determine a respective identifier for each of the plurality of additional resources.

5. The system of claim 2, wherein the at least one computing device is further configured to generate a notification confirming a quantity of the plurality of additional resources were delivered.

6. The system of claim 1, wherein the at least one computing device is further configured to compute the amount and generate the request responsive to determining the quantity of resources removed.

7. The system of claim 1, wherein the at least one sensor comprises at least one of: a visible light sensor, an infrared sensor, or an ultraviolet sensor.

8. A non-transitory computer-readable medium embodying a program that, when executed by at least one computing device, causes the at least one computing device to:
record imagery of at least one rack;
determine that the imagery is dissimilar to at least one preceding imagery;
interrogate RFID tags responsive to determining that the imagery is dissimilar;
receive a plurality of measurements related to a plurality of resources positioned within the at least one rack in a facility associated with an entity responsive to interrogating the RFID tags;
determine a quantity of resources removed from the plurality of resources and a resource identifier based on the plurality of measurements;
compute an amount based on the resource identifier and the quantity of resources;
generate a request comprising the resource identifier, the quantity of resources removed, and the amount; and
transmit the request to an entity associated with the at least one rack in the facility.

9. The non-transitory computer-readable medium of claim 8, wherein the program further causes the at least one computing device to detect a change in weight associated with the at least one rack, wherein the quantity of resources removed from the plurality of resources and the resource identifier are determined in response to detecting the change.

10. The non-transitory computer-readable medium of claim 8, wherein the program further causes the at least one computing device to update a user interface rendered on a display associated with the at least one computing device to reflect a decremented quantity of resources in the at least one rack based on the quantity of resources removed.

11. The non-transitory computer-readable medium of claim 8, wherein the program further causes the at least one computing device to generate a request for additional resources responsive to determining the quantity of resources removed.

12. The non-transitory computer-readable medium of claim 8, wherein the program further causes the at least one computing device to:
generate a training set of data based on a resource delivery and consumption history;
training at least one machine learning model based on the training set of data; and
generate a date for scheduling of a subsequent delivery by applying the at least one machine learning model.

13. The non-transitory computer-readable medium of claim 12, wherein the program further causes the at least one computing device to:
test a validity of the at least one machine learning model using a subsequent resource delivery and consumption history; and
in response to the validity failing, retrain the at least one machine learning model based on the subsequent resource delivery and consumption history.

14. A method, comprising:
recording, via at least one computing device, imagery of at least one rack;
determining, via the at least one computing device, that the imagery is dissimilar to at least one preceding imagery;
interrogating, via the at least one computing device, RFID tags responsive to determining that the imagery is dissimilar;
receiving, via the at least one computing device, a plurality of measurements related to a plurality of resources positioned within the at least one rack in a facility associated with an entity responsive to interrogating the RFID tags;
determining, via the at least one computing device, a quantity of resources removed from the plurality of resources and a resource identifier based on the plurality of measurements;
computing, via the at least one computing device, an amount based on the resource identifier and the quantity of resources;
generating, via the at least one computing device, a request comprising the resource identifier, the quantity of resources removed, and the amount; and
transmitting, via the at least one computing device, the request to an entity associated with the at least one rack in the facility.

15. The method of claim 14, further comprising decreasing, via the at least one computing device, at least one resource counter associated with the at least one rack based on determining the quantity of resources were removed.

16. The method of claim 15, wherein the quantity of resources are associated with a particular case of a plurality of cases, and decrementing the at least one resource counter comprises decrementing a particular counter associated with the particular case.

17. The method of claim 14, further comprising decrementing, via the at least one computing device, a resource availability counter based on the quantity of resources being removed.

18. The method of claim 17, further comprising:
determining, via the at least one computing device, that the decremented resource availability counter fell below a predetermined threshold quantity; and
in response to the decremented resource availability threshold being below the predetermined threshold, generating, via the at least one computing device, a request for payment for the quantity of resources being removed.

19. The method of claim 14, further comprising rendering, via the at least one computing device, an updated user interface on a display showing the quantity of resources in the at least one rack.

20. The method of claim 14, further comprising:
generating, via the at least one computing device, a training set of data based on a resource delivery and consumption history;
training, via the at least one computing device, at least one machine learning model based on the training set of data;
testing, via the at least one computing device, a validity of the at least one machine learning model using a subsequent resource delivery and consumption history; and in response to the validity failing, retraining, via the at least one computing device, the at least one machine learning model based on the subsequent resource delivery and consumption history.

\* \* \* \* \*